United States Patent
Liu et al.

(10) Patent No.: US 12,353,401 B1
(45) Date of Patent: Jul. 8, 2025

(54) DATABASE SYSTEMS AND CLIENT-SIDE METHODS FOR OFFLINE OPERATION

(71) Applicant: Salesforce, Inc., San Francisco, CA (US)

(72) Inventors: Keye Liu, San Francisco, CA (US); Dai Duong Doan, San Francisco, CA (US)

(73) Assignee: Salesforce, Inc.

( * ) Notice: Subject to any disclaimer, the term of this patent is extended or adjusted under 35 U.S.C. 154(b) by 0 days.

(21) Appl. No.: 18/662,548

(22) Filed: May 13, 2024

(51) Int. Cl.
  *G06F 16/23* (2019.01)
  *G06F 16/28* (2019.01)

(52) U.S. Cl.
  CPC ........ *G06F 16/2372* (2019.01); *G06F 16/287* (2019.01)

(58) Field of Classification Search
  CPC ............................ G06F 16/2372; G06F 16/287
  USPC ........................................................ 707/610
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |

(Continued)

*Primary Examiner* — Giovanna B Colan
(74) *Attorney, Agent, or Firm* — Lorenz & Kopf, LLP

(57) ABSTRACT

Database systems and methods are provided for supporting offline operation of a process flow associated with a native application at a client device. In an offline mode, the method creates a junction object at a client device maintaining an association between a flow and a record, generates a GUI display associated with the flow using downloaded flow configuration metadata, creates a second record comprising input information for the one or more fields for a form associated with the flow via the GUI element(s) of the GUI display, and updates the junction object to maintain an association with the second record. In response to exiting the offline mode, the method automatically creates a form record associated with the record at the database system using the junction object, where the form record includes the input information for the one or more fields from the second record at the client device.

20 Claims, 6 Drawing Sheets

(56) References Cited

U.S. PATENT DOCUMENTS

| | | |
|---|---|---|
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 * | 1/2005 | Warner ............... G06F 16/287 707/999.102 |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,599,454 B2 * | 3/2020 | Bailey ................. G06F 16/113 |
| 11,269,668 B2 * | 3/2022 | Bailey ................. G06F 8/656 |
| 11,321,422 B1 | 5/2022 | Stone et al. |
| 11,797,638 B2 | 10/2023 | Stone et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 * | 10/2011 | Bulumulla ............ G06F 21/00 726/4 |
| 2012/0042218 A1 * | 2/2012 | Cinarkaya ............ G06F 11/327 714/57 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2020/0097577 A1 * | 3/2020 | Nielsen ................. G06F 3/0482 |
| 2021/0232578 A1 * | 7/2021 | Cogan ................. G06F 16/2425 |
| 2022/0245206 A1 | 8/2022 | Stone et al. |

* cited by examiner

DATABASE SYSTEMS AND CLIENT-SIDE METHODS FOR OFFLINE OPERATION

TECHNICAL FIELD

One or more implementations relate to the field of database systems, and more specifically, to offline operation of client-side native applications that interact with records at a database system.

BACKGROUND

Modern software development has evolved towards web applications or cloud-based applications that provide access to data and services via the Internet or other networks. For example, social media platforms and other collaborative web sites allow users to exchange direct messages or form groups for broadcasting messages and collaborating with one another. In business environments and customer relationship management (CRM) contexts, communication platforms facilitate users sharing information about sales opportunities or other issues surrounding products or services and track changes to projects and sales opportunities by receiving broadcast updates about coworkers, files, and other project related data objects.

In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. Multi-tenant cloud-based architectures have been developed to support multiple user groups (also referred to as "organizations" or "tenants") using a common hardware and software platform. Some multi-tenant database systems include an application platform that supports a customizable user experience, for example, to create custom applications, web pages, reports, tables, functions, and/or other objects or features.

In practice, it is desirable to provide mobile applications that allow users to interact with a cloud-based database system to retrieve and access data and other cloud-based services or functionality at a user's cellular phone, tablet or other mobile device. Moreover, in addition to supporting common features and functionality, in some instances, it is desirable to support more customizable user experiences with customizations that can be integrated with the mobile application, adding another layer of complexity between the cloud-based data system and the end user. However, this is further complicated by the variability or unavailability of network connections across different mobile devices operating in different geographic regions. Accordingly, it is desirable to increase potential customizations to increase productivity and improve user experiences while also accommodating offline operation to account for real-world variability in network connectivity.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
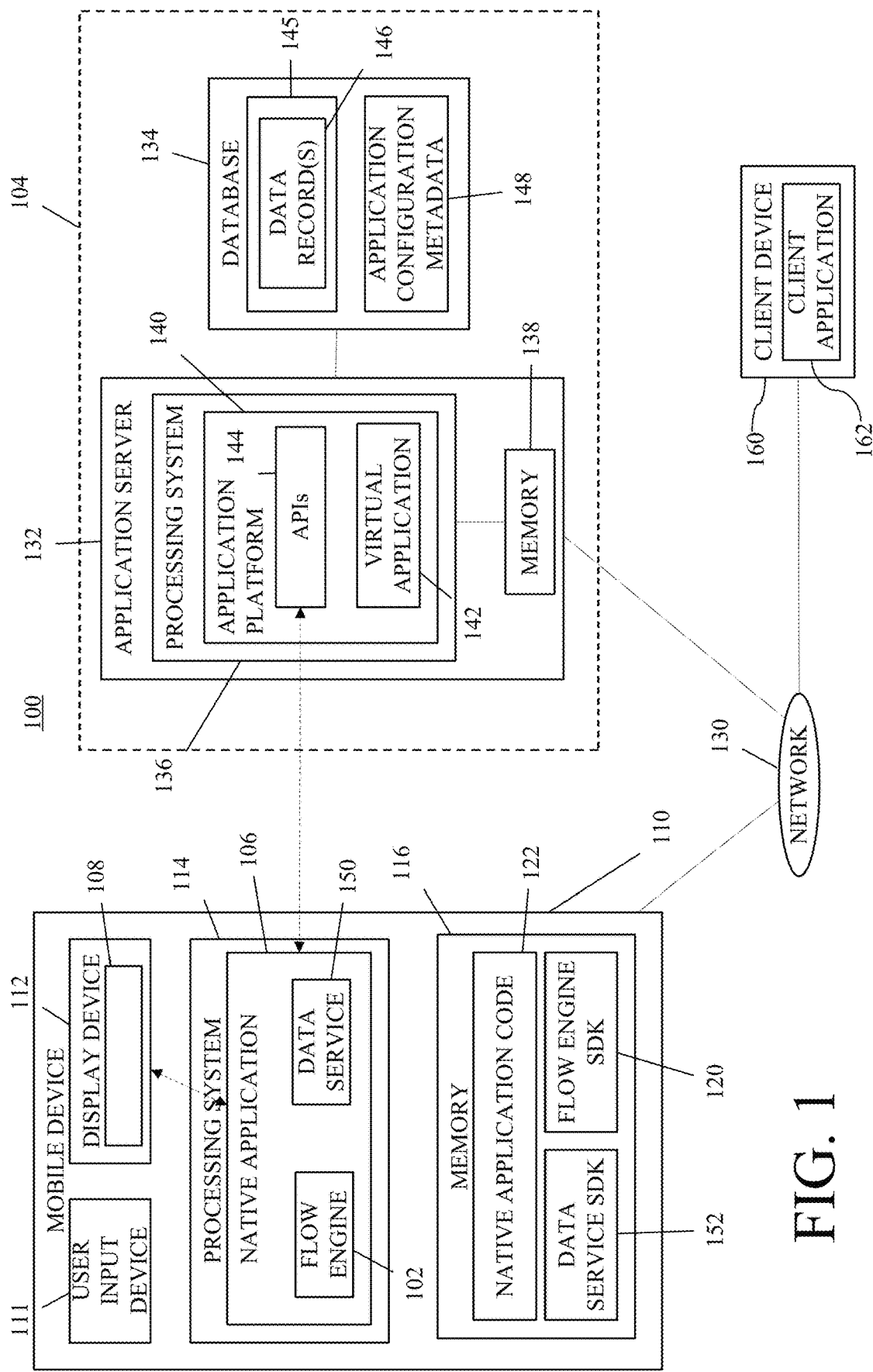
FIG. 1 is a block diagram illustrating a computing system that includes a flow engine service associated with a native application that supports offline execution of a process flow defined by configuration metadata maintained at a database system according to some example implementations.

The following description describes implementations for enabling native applications supporting customizable or user-configurable flows in an offline mode that are capable of interacting with records at a database system using a client-side service that supports create, read, update, and delete (CRUD) operations in a manner that abstracts underlying details to support both online and offline operation. In this regard, a flow generally represents an application process flow or other automated process that collects, receives or otherwise obtains data and executes or otherwise performs actions using that data to produce a corresponding result of the flow. For example, in one or more implementations, the native application is realized as a field service application that is capable of being downloaded and installed at a client mobile device (e.g., a cellular phone, a smartphone, a tablet, or the like), where the flow generally represents a form or other field service mobile flow that involves user interaction and navigation through one or more graphical user interface (GUI) displays or screens.

In exemplary implementations, the flow is realized as a form process flow that includes a sequence of GUI displays for collecting data from a client end user (e.g., a data capture form or a data collection form), which may be designed in a visual, WYSIWYG, drag and drop, declarative, and low code (or no code) manner using user-configurable web components. For example, a form flow may be visually-defined in the form of a flow chart diagram that includes elements representing actions that the flow can execute (e.g., reading or writing data, displaying information to and/or collecting data from a user, executing logic, manipulating data and/or the like) and connectors that define the available paths the flow can take at run time. Some examples of visual, low code (or no code) WYSIWYG flow design are described in U.S. Pat. Nos. 11,269,668, 11,321,422 and 11,797,638.

As described in greater detail below, to support offline operation, a client-side service downloads, to a client-side data storage, flow configuration metadata and related data records associated with the GUI displays or components thereof to be utilized for generating the sequence of GUI displays associated with the form process flow. Thereafter, in response to receiving user input or other indicia of a desire to initiate the form process flow with respect to a particular record when in an offline mode, a client-side flow engine service associated with the native application utilizes the downloaded flow configuration metadata and record data to create a junction object in the cache or other data storage at the client device for maintaining associations between user input or other data collected during execution of the form process flow and the particular record. The client-side flow engine service utilizes the downloaded flow configuration metadata and record data to generate an initial GUI display associated with the form process flow at the client device. The end user may then utilize the GUI element(s) of the GUI display to input information for one or more fields of the form corresponding to the form process flow, which in turn, may result in the client-side flow engine service creating one or more additional records object in the cache or other data storage at the client device that maintain the input information for the fields of the form associated with the record or otherwise maintain the current state or progress of the execution of the form process flow. After creating records for maintaining the user input information and flow execution state, the client-side flow engine service updates the junction object to maintain the associations between the different records associated with the respective instance of the form process flow.

When the form process flow is completed in the offline mode, the client-side flow engine service interacts with a client-side data service integrated with the native application to automatically create a corresponding form record at the database system that maintains the input information collected from the end user during execution of the form process flow. The client-side data service is configurable to support both online or offline operation of the native application, and creates a corresponding record in its associated data storage at the client-side. Thereafter, when the native application exits the offline mode or network connectivity is otherwise reestablished, the client-side data service may automatically upload and create the corresponding form record at the database system, thereby allowing the data or other input information collected from the end user while offline to be automatically uploaded and propagated back to the database system to reflect execution of the form process flow with respect to a particular record in the database system while the native application was offline.

For example, in some implementations, the client-side flow engine service associated with a field service mobile application utilizes the client-side data service to download and maintain the data capture form process flow configuration metadata and related data records from the database system to a local client-side cache that is associated with or otherwise managed by the client-side data service. Thereafter, when a user attempts to execute the data capture form process flow in an offline mode, the flow engine service uses the downloaded configuration metadata to generate the GUI displays associated with the data capture form process flow in a manner that emulates online operation without reliance on the database system or other communications network. The client-side flow engine service also utilizes the client-side data service to create records for tracking or otherwise maintaining the state of the user's progress through the various GUI displays associated with the data capture form process flow and utilizes the client-side data service to perform CRUD actions associated with the data capture form process flow with respect to downloaded instances of database records maintained in the client-side data service cache. In this regard, the flow engine service may utilize the downloaded data capture form process flow configuration metadata to create local instances of new database records with the appropriate fields, format or other structure at the client-side in the offline mode, with the client-side data service automatically generating and assigning placeholder or dummy record identification values to records created by the flow engine service in the offline mode. Additionally, the client-side data service may automatically buffer or queue various database transactions or other actions associated with the data capture form process flow when in the offline mode.

When the field service mobile application returns to an online mode, the client-side data service may automatically execute, initiate, or otherwise perform any database transactions or other actions associated with the offline execution of the data capture form process flow that were queued by the client-side data service. Additionally, the client-side data service may interact with one or more application programming interfaces (APIs) at the database system to upload or otherwise convert the local instances of new database records created at the client-side into corresponding records at the database system. In this regard, when an API or other service at the database system creates a respective instance of a record at the database system, the API or service at the database system may automatically generate and assign one or more identification values to the record in lieu of any placeholder or dummy record identification values assigned by the client-side data service. Thereafter, the client-side data service may dynamically update or otherwise synchronize the corresponding records maintained in the client-side data service cache with the database system by swapping the placeholder record identifier values with those assigned to the respective records at the database system.

FIG. 1 depicts an exemplary computing system 100 that includes a client-side flow engine service 102 capable of supporting offline execution of customizable process flows within the context of a native application 106 executing at a client mobile device 110 using application configuration metadata 148 maintained at a database system 104 and subsequent interactions between the database system 104 and the native application 106 via a client-side data service 150. In this regard, the client-side flow engine service 102 facilitates the native application 106 generating a sequence of one or more customizable GUI displays 108 on a display device 112 of the mobile device 110 in an offline mode without reliance on a communications network 130 to retrieve the process flow configuration metadata 148 from the database system 104. It should be appreciated that FIG. 1 is a simplified representation of a computing system 100 and is not intended to be limiting. In the illustrated implementation, the database system 104 includes one or more servers 132 that users of client mobile devices 110 may interact with, over a communications network 130 (e.g., the Internet or any sort or combination of wired and/or wireless computer network, a cellular network, a mobile broadband network, a radio network, or the like), by using the native application 106 to view, access or obtain data or other information from one or more data records 146 at a database 134 or other repository associated with the database system 104.

In one or more exemplary implementations, the database system 104 includes one or more application servers 132 that support an application platform 140 capable of providing instances of virtual applications 142, over the network 130, to any number of client devices 110, 160 that users may interact with to obtain data or other information from one or more data records 146 maintained in one or more data tables 145 at the database 134 associated with the database system 104. For example, the database 134 may maintain, on behalf of a user, tenant, organization or other resource owner, data records 146 entered or created by that resource owner (or users associated therewith), files, objects or other records uploaded by the resource owner (or users associated therewith), and/or files, objects or other records automatically generated by one or more computing processes (e.g., by the server 132 based on user input or other records or files stored in the database 134). In this regard, in one or more implementations, the database system 104 is realized as an on-demand multi-tenant database system that is capable of dynamically creating and supporting virtual applications 142 based upon data from a common resource database 134 that is shared between multiple tenants, which may alternatively be referred to herein as a multi-tenant database. Data and services generated by the virtual applications 142 may be provided via the network 130 to any number of client devices, as desired, where instances of the virtual application may be suitably generated at run-time (or on-demand) using a common application platform 140 that securely provides access to the data in the database 134 for each of the various tenants subscribing to the multi-tenant system.

The application server 132 generally represents the one or more server computing devices, server computing systems or other combination of processing logic, circuitry, hardware, and/or other components configured to support remote access to data records maintained in the data tables at the database 134 via the network 130. Although not illustrated in FIG. 1, in practice, the database system 104 may include any number of application servers 132 in concert with a load balancer that manages the distribution of network traffic across different servers 132 of the database system 104.

In exemplary implementations, the application server 132 generally includes at least one processing system 136, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 132 may also include one or more communications interfaces, which include any number of transmitters, receiver, transceivers, wired network interface controllers (e.g., an Ethernet adapter), wireless adapters or another suitable network interface that supports communications to/from the network 130 coupled thereto. The application server 132 also includes or otherwise accesses a data storage element 138 (or memory), and depending on the implementation, the memory 138 may be realized as a random-access memory (RAM), read-only memory (ROM), flash memory, magnetic or optical mass storage, or any other suitable non-transitory short- or long-term data storage or other computer-readable media, and/or any suitable combination thereof. In exemplary implementations, the memory 138 stores code or other computer-executable programming instructions that, when executed by the processing system 136, are configurable to cause the processing system 136 to support or otherwise facilitate the application platform 140 and the subject matter described herein.

In exemplary implementations, the code or other computer-executable programming instructions maintained in the memory 138 are executable by the processing system 136 at the application server 132 to provide one or more application programming interfaces 144 (APIs) that are configurable to allow client devices 110, 160 to interact with data records 146 or other configuration metadata 148 maintained at the database 134 via the application server 132. For example, some non-limiting examples of standard APIs 144 supported by the application platform 140 can include, but are not limited to, Simple Object Access Protocol (SOAP) API(s), representational state transfer (REST) API(s), bulk API(s), streaming API(s), Chatter REST API(s), user interface API(s), analytics REST API(s), metadata API(s), APEX® REST API(s), APEX® SOAP API(s), tooling API(s) and the like. REST and SOAP APIs are two commonly used APIs to expose data from an application platform 140 to other platforms or to allow external applications to invoke APEX® methods. For example, a REST API may support HTTP requests to access and use data to perform create, read, update, and delete (CRUD) operations concerning resources (e.g., create, read, update, and delete data records 146), which are referred to as GET, POST, PUT, and DELETE operations in REST API parlance. A SOAP API may support XML and be used to create, update, delete, retrieve (CRUD) records in any language that supports web services, and may be utilized to maintain passwords, perform searches, retrieve metadata, etc. A bulk API may be realized as a specialized REST API for loading and querying large amounts of data at once, and in some implementations, a bulk API may be asynchronous, such that a response with results can come back at some arbitrary time later (within a timeout window) after a request is submitted. A streaming API is a specialized API for setting up notifications that trigger when changes are made to data (e.g., to the values for one or more data fields of one or more data records 146) using a publish-subscribe (pub/sub) model in which clients can subscribe to channels that broadcast certain types of data changes to reduce the number of API requests and eliminate the need for polling.

In exemplary implementations, the database 134 stores or otherwise maintains data for integration with or invocation by the virtual application 142 in objects having corresponding data records 146 organized in object tables. In this regard, the database 134 may include any number of different object tables configured to store or otherwise maintain alphanumeric values or other descriptive information that define a particular instance of a respective type of object associated with a respective object table. For example, the virtual application 142 may support a number of different types of objects that may be incorporated into or otherwise depicted or manipulated by the virtual application 142, with each different type of object having a corresponding object table that includes columns or fields corresponding to the different parameters or criteria that define a particular instance of that object. In addition to standard objects that may be supported by the application platform 140 and/or the native application 106 across different resource owners, organizations or tenants, the database 134 may also store or otherwise maintain custom objects for association and/or integration with the application platform 140 and/or the native application 106. For example, an administrator user associated with a particular resource owner may utilize an instance of a virtual application 142 to create or otherwise define a new custom field to be added to or associated with a standard object, or define a new custom object type that includes one or more new custom fields associated therewith. In this regard, the database 134 may also store or otherwise maintain metadata that defines or describes the fields, process flows, workflows, formulas, business logic, structure and other database components or constructs that may be associated with a particular database object. In various implementations, the database 134 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with workflow rules or logical criteria associated with respective types of database object types that define actions, triggers, or other logical criteria or operations that may be performed or otherwise applied to entries in the various database object tables (e.g., in response to creation, changes, or updates to a record in an object table).

In some implementations, in addition to the metadata and rules associated with a particular type of database object, the database 134 stores or otherwise maintains application configuration metadata 148 that includes different parameters or criteria that define a particular configuration to be applied to instances of the native application 106 and/or the virtual application 142 for users associated with a particular resource owner, tenant or organization. In this regard, the application configuration metadata 148 may include values or fields that define the layout, sequencing, and other characteristics or parameters associated with one or more GUI displays 108 and/or GUI display components incorporated therein to be presented by an instance of the native application 106 executing on a mobile device 110 associated with a user affiliated with that particular resource owner. The application configuration metadata 148 may also include additional settings or configurations associated with the native application 106, as described in greater detail below. Moreover, in some implementations, the application configuration metadata 148 may define different process flows, workflows, actions, triggers, or other logical criteria or operations that may be performed or otherwise applied at the database system 104 responsive to client-side events or other indicia received from the flow engine service 102.

Still referring to FIG. 1, the mobile device 110 generally represents an electronic device coupled to the network 130 that may be utilized by a user to access a native application 106 executing on or at the mobile device 110 that supports interaction with the database system 104. In exemplary embodiments, the mobile device 110 is realized as any sort of mobile phone, cellular phone, smartphone, table or other network-enabled electronic device coupled to the network 130 that executes or otherwise supports the native application 106 that allows a user to access one or more GUI displays 108 provided by the native application 106. In exemplary implementations, the mobile device 110 includes a display device 112, such as a monitor, screen, or another conventional electronic display, capable of graphically presenting data and/or information along with a user input device 111, such as a touchscreen, a touch panel, a sensor, or the like, capable of receiving input from the user of the mobile device 110. The display device 112, the user input device 111 and other input/output interfaces associated with the mobile device 110 are coupled to a processing system 114, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the mobile device 110 described herein. In exemplary implementations, the processing system 114 is coupled to a data storage element 116 (or memory), which may be realized as a random-access memory (RAM), read-only memory (ROM), flash memory, magnetic or optical mass storage, or any other suitable non-transitory short- or long-term data storage or other computer-readable media, and/or any suitable combination thereof.

In exemplary implementations, the memory 116 of the mobile device 110 stores code or other computer-executable programming instructions associated with the native application 106 (e.g., native application code 122) that, when executed by the processing system 114, are configurable to cause the processing system 114 to generate, support, provide or otherwise facilitate an instance of the native application 106 at the mobile device 110. In one or more implementations, the native application code 122 may be realized as a managed or distributed software package (or code package) that is published or otherwise made available to other users for installation or integration, where the software package generally includes a bundle of components that make up the native application 106 (and the functionality thereof) that may be integrated with or otherwise supported by an operating system of the mobile device 110 to interact with the database objects or other data records 146 maintained at the database system 104 independent of the application platform 140 and/or the virtual application 142. For example, the native application code 122 may be realized as one or more class files or objects within a file, folder, or other software package (e.g., a ZIP file, a file folder, or other logical container) corresponding to the instance of the native application 106 that are downloaded from the database system 104 over the network 130 and stored in the memory 116 for subsequent execution by the processing system 114.

In exemplary implementations, the memory 116 of the mobile device 110 also stores code or other computer-executable programming instructions associated with the client-side flow engine service 102 that is integrated with, invoked by or otherwise incorporated into the native application 106 (e.g., the flow engine software development kit (SDK) 120). In this regard, the flow engine SDK 120, when executed by the processing system 114, causes the processing system 114 to generate, support, provide or otherwise facilitate the flow engine service 102 and the related features, functionality, operations and/or processes described herein in connection with the instance of the native application 106 at the mobile device 110. In one or more implementations, similar to the native application code 122, the flow engine SDK 120 may be realized as a managed or distributed software package (or code package) that is published or otherwise made available to other users for installation or integration with instances of the native application 106. For example, in one implementation, an administrator associated with a resource owner may utilize a client device 160 to configure metadata 148 associated with the configuration of instances of the native application 106 associated with that resource owner to include or otherwise incorporate the flow engine SDK 120 with the native application code 122, such that when users associated with that resource owner download the software package for the native application 106, the flow engine SDK 120 is automatically included and integrated with the native application code 122 at the mobile device 110.

In exemplary implementations, the instance of the native application 106 at the mobile device 110 is configured to utilize a client-side data service 150 that supports interactions with the database system 104 and independently maintains its own associated cache of data, alternatively referred to herein as the data service cache. In a similar manner as described above, an administrator associated with a resource owner may utilize the client device 160 to modify or otherwise configure the application configuration metadata 148 to include or otherwise incorporate the data service 150, such that the code or other computer-executable programming instructions associated with the data service 150 (e.g., the data service SDK 152) is downloaded from the database system 104 to the memory 116 at the mobile device 110 to be integrated with or otherwise incorporated into the native application 106. To support the client-side data service 150, the native application 106 downloads application configuration metadata 148 that indicates the client-side data service 150 is to be utilized to retrieve data from the data records 146 maintained at the database system 104. Thereafter, based on the downloaded application configuration metadata indicating the client-side data service 150 should be utilized, the native application 106 and/or the flow engine service 102 generates or otherwise provides requests for data from the database system 104 to the client-side data service 150, such that the client-side data service 150 functions as an intermediary between the native application 106 and the database system 104. The client-side data service 150 utilizes one or more APIs 144 at the database system 104 to download record data from the data records 146 corresponding to the various components to be incorporated into the native application 106, and the client-side data service 150 utilizes the local data service cache to support sharing record data across different components that may be integrated into the native application 106 to improve efficiency and reduce complexity. Additionally, the client-side data service 150 and the corresponding data records 146 at the database system 104 (which may include application extension objects) allow for server-side control and customization of the native application 106. In one or more implementations, the client-side data service 150 is realized as the Salesforce Lightning Data Service (LDS), where the configuration of the native application 106 to utilize the client-side data service 150 is alternatively referred to herein as the LDS mode.

In various implementations, the memory 116 of the mobile device 110 also stores code or other computer-executable programming instructions associated with an application extension that is integrated with, invoked by or otherwise incorporated into the native application 106. In this regard, the application extension code, when executed by the processing system 114, causes the processing system 114 to generate, support, provide or otherwise facilitate further customization of the GUI displays 108 or other custom features, functionality, operations and/or processes to be incorporated into or integrated with the native application 106. Similar to the native application code 122 and the flow engine SDK 120, the application extension code may be downloaded from the database system 104 and installed at the mobile device 110 in connection with the download and the installation of the native application code 122 and the flow engine SDK 120. For example, in one implementation, the application extension code may be realized using an application extension object in the database 134 that stores or otherwise maintains columns or fields of values corresponding to the different parameters or criteria that customize native application 106 or the GUI displays 108 associated therewith, for example, by defining a custom GUI display component to be incorporated into a particular GUI display 108 associated with the native application 106. Similar to the application configuration metadata 148, an administrator associated with a resource owner may utilize a client device 160 to configure data records 146 for application extension objects to be associated with instances of the native application 106 associated with that resource owner, such that when users associated with that resource owner download the software package for the native application 106, the corresponding application extension code 124 embodied by the application extension objects is downloaded and automatically included and integrated with the native application code 122 at the mobile device 110. In this regard, an application extension and its associated functionality may be specific to a particular resource owner or user as a customization applied to or in addition to the underlying core functionality provided by the native application 106 and supported by the database system 104 across all users or resources owners.

The client device 160 generally represents an electronic device coupled to the network 130 that may be utilized by a user to access an instance of the virtual application 142 using an application 162 executing on or at the client device 160. In practice, the client device 160 can be realized as any sort of personal computer, mobile telephone, tablet or other network-enabled electronic device coupled to the network 130 that executes or otherwise supports a web browser or other client application 162 that allows a user to access one or more GUI displays provided by the virtual application 142. In exemplary implementations, the client device 160 includes a display device, such as a monitor, screen, or another conventional electronic display, capable of graphically presenting data and/or information along with a user input device, such as a touchscreen, a touch panel, a sensor, or the like, capable of receiving input from the user of the client device 160. The illustrated client device 160 executes or otherwise supports a client application 162 that communicates with the application platform 140 provided by the processing system 136 at the application server 132 to access an instance of the virtual application 142 using a networking protocol. In some implementations, the client application 162 is realized as a web browser or similar local client application executed by the client device 160 that contacts the application platform 140 at the application server 132 using a networking protocol, such as the hypertext transport protocol (HTTP). In this manner, in one or more implementations, the client application 162 may be utilized to access or otherwise initiate an instance of a virtual application 142 hosted by the database system 104, where the virtual application 142 provides one or more web page GUI displays within the client application 162 that include GUI elements for interfacing and/or interacting with records 146 and/or metadata 148 maintained at the database 134. In this regard, an administrator user associated with a particular resource owner may utilize the client application 162 to access an instance of the virtual application 142 to configure the data records 146 for the application extension objects to be incorporated with instances of the native application 106 for users associated with that particular resource owner as well as configuring the application configuration metadata 148 that defines, controls or otherwise customizes the GUI displays 108, the native application GUI display components 160 and/or the functionality of the native application 106, as described in greater detail below.

In one or more implementations, the database 134 stores or otherwise maintains data records 146 for one or more database objects that may be referenced or otherwise invoked by the application configuration metadata 148 and/or the application extension objects to support incorporation of one or more configurable web components into instances of the native application 106 and/or the virtual application 142. In this regard, a configurable web component generally includes Hypertext Markup Language (HTML) code or other presentation code defining the manner in which the configured web component is to be displayed or rendered, JavaScript or other client-side executable behavioral code defining the event-driven behavior of the configured web component, and user-defined metadata including values or properties that are input or otherwise defined for various fields, parameters, variables or other attributes associated with the respective web component. In this regard, in such implementations, the application extension code downloaded to the mobile device 110 may include the HTML code and JavaScript along with other code and/or values that are executed or otherwise referenced by the processing system 114 in connection with executing the native application code 122 for the native application 106 to incorporate custom web components into the GUI displays 108 rendered by the native application 106.

In an online mode when a connection to the database system 104 over a communications network 130 is present, during execution of the native application 106, the native application 106 interacts with the data service 150 to retrieve data from the database system 104 via the APIs 144 and/or the application platform 140 to support rendering the GUI displays 108 associated with a process flow in the context of the native application 106 and support other functionality of the native application 106 in accordance with the application configuration metadata 148. In the absence of a connection to a communications network 130 or when the native application 106 is otherwise configured in an offline mode, the flow engine service 102 supports offline rendering of the GUI displays 108 associated with a process flow using the memory 116 and the data service 150 at the mobile device 110. For example, upon initialization of the native application 106, the flow engine service 102 may download or otherwise retrieve, from the database system 104 over the network 130 (e.g., via one or more APIs 144 supported by the application platform 140 at the application server 132), the respective subset(s) of application configuration metadata 148 for the process flows to be supported by the flow engine service 102 in an offline mode and record data from different data records 146 associated with the particular resource owner and/or mobile device end user that are invoked or likely to be invoked by those process flows. In this regard, the downloaded metadata and record data support the desired customizations of the GUI displays 108 generated by the flow engine service 102 without reliance on the APIs 144, the application platform 140 and/or the communications network 130.

Figure 2:
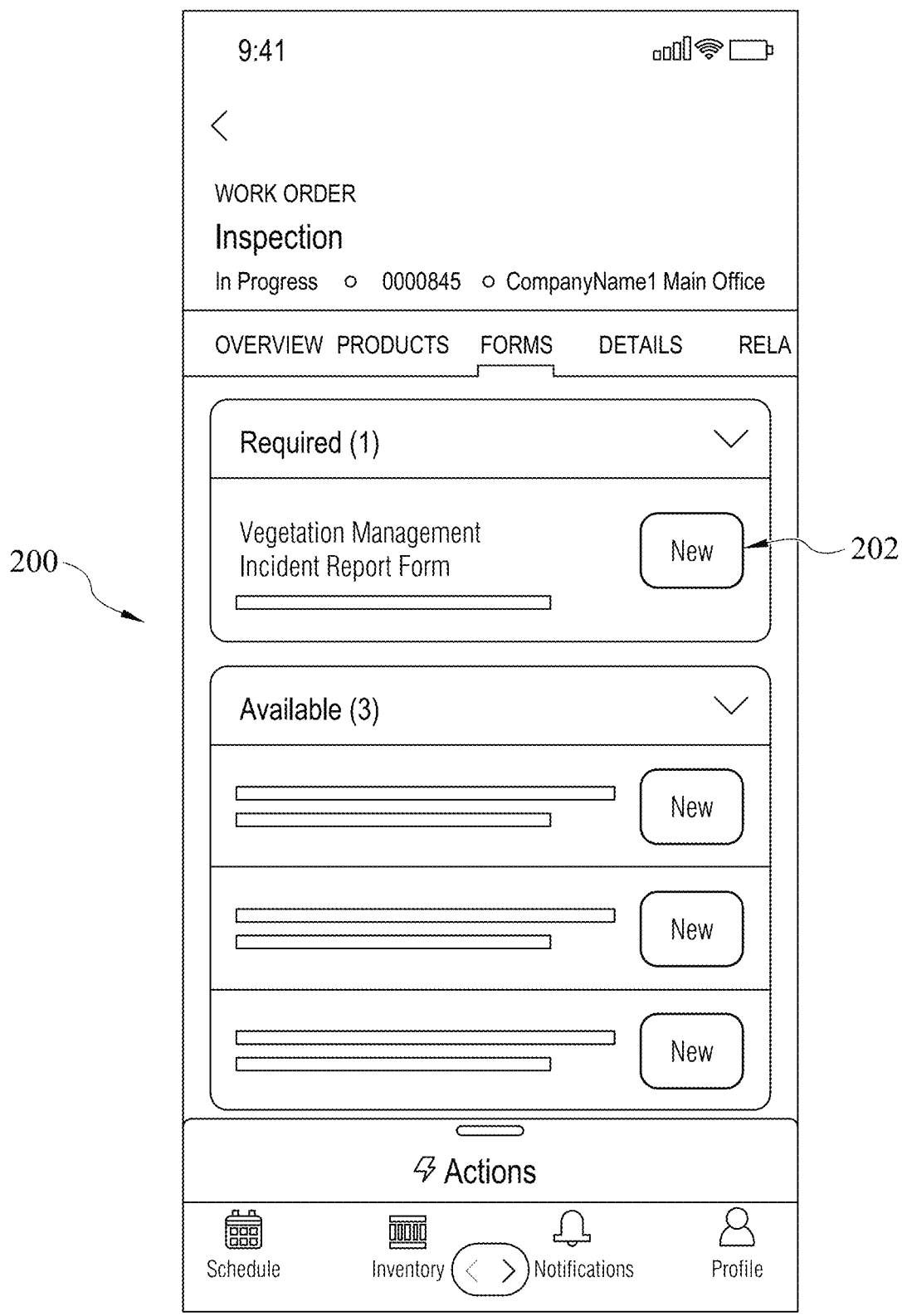
FIG. 2 depict an exemplary graphical user interface (GUI) display suitable for presentation by the native application in the computing system of FIG. 1 according to some example implementations.

Referring to FIG. 2 with continued reference to FIG. 1, in exemplary implementations, the flow engine service 102 is configured to support offline execution of data capture form process flows that include a sequence of GUI displays 108 and corresponding text boxes, drop-down menus, picklists and/or other GUI elements for capturing or otherwise receiving data input by a user of the mobile device 110 for purposes of creating or updating one or more corresponding records 146 at the database system 104. For example, in the context of a field service mobile application 106, the data capture form process flow may be configured to capture user input data for a work order associated with a service appointment. In this regard, upon initialization of the field service mobile application 106, the flow engine service 102 may download or otherwise obtain data capture form configuration metadata 148 for that resource owner that defines the customizable sequence of GUI displays 108 to be presented in connection with a data capture form for that resource owner and the corresponding customizable GUI elements for obtaining input data for a customizable set of fields for work orders, service appointments, or other field service objects associated with the resource owner.

FIG. 2 depicts an exemplary form landing page GUI display 200 suitable for presentation by field service mobile application 106 (e.g., as a GUI display 108 on the display device 112). For example, when the field service mobile application 106 launches or is otherwise initiated at the mobile device 110, the field service mobile application 106 and/or the data service 150 may automatically download record data from one or more data records 146 associated with the resource owner and/or the user of the mobile device 110, such as, for example, values for one or more fields of data associated with the data records 146 for one or more work orders, service appointments, and/or other field service objects associated with the resource owner that the user is authorized to access or is otherwise assigned to. The downloaded record data may be maintained in the local memory 116 or other data storage at the mobile device 110 (e.g., a cache associated with the processing system 114, a cache associated with the data service 150, and/or the like) for quicker reference by the field service mobile application 106. Additionally, the flow engine service 102 may download or otherwise obtain data capture form configuration metadata 148 that includes information identifying the particular type, number and/or configuration of data capture forms associated with the particular resource owner and/or the downloaded records, and additionally, in some implementations, download existing data capture form record data from corresponding data capture form data records 146 maintained at the database system 104. Thereafter, when a user manipulates or otherwise interacts with the field service mobile application 106 to navigate to the form landing page GUI display 200 (e.g., by selecting the "FORMS" tab menu element) associated with a particular field service record or object (e.g., a work order, a service appointment, or the like), the flow engine service 102 and/or the field service mobile application 106 may utilize the downloaded data capture form metadata and corresponding record data to automatically populate the form landing page GUI display 200 with information identifying the potential data capture forms configured by the resource owner for that particular field service record or object along with corresponding GUI elements for initiating or otherwise accessing a respective one of the data capture forms.

Figure 3:
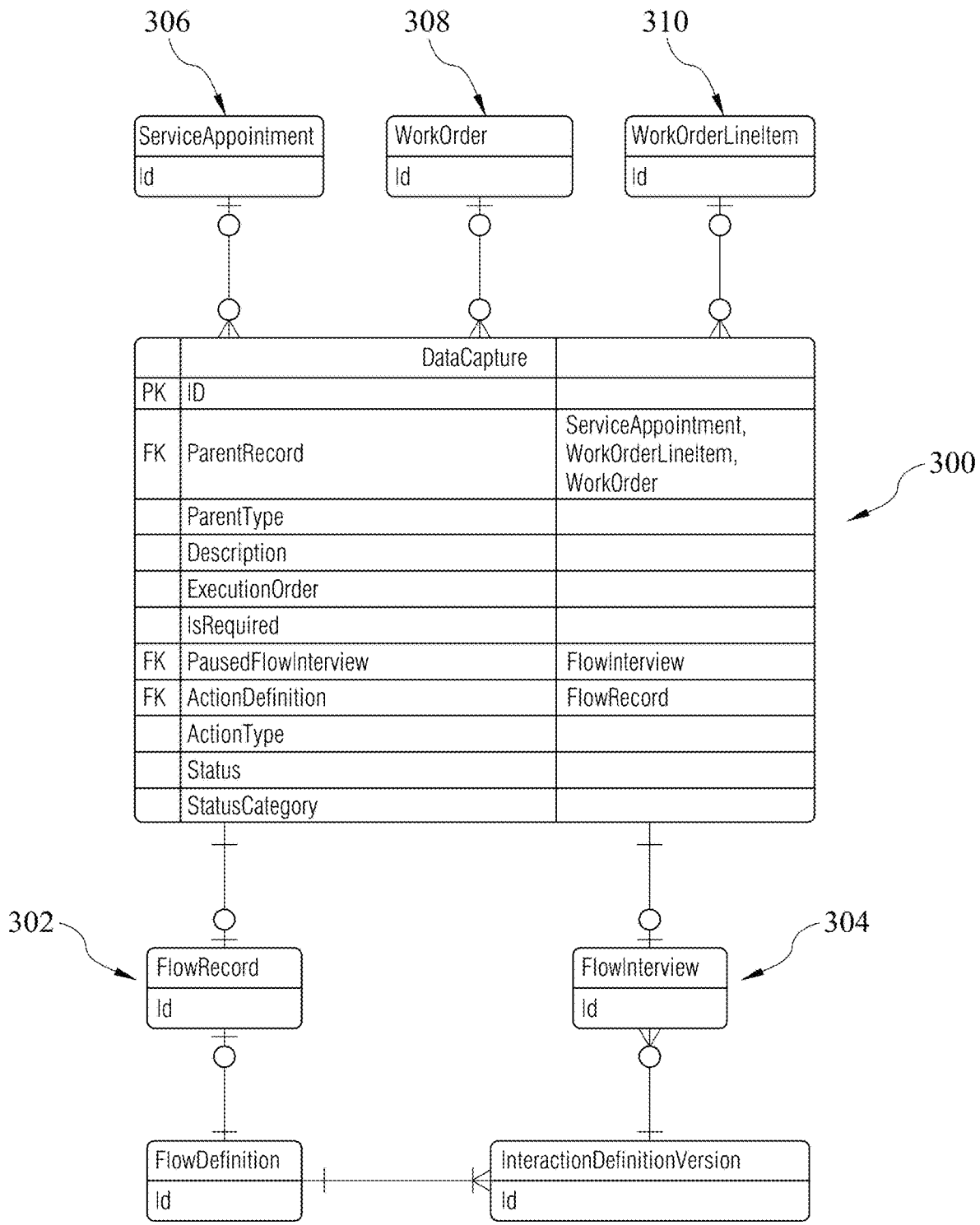
FIG. 3 is a block diagram illustrating an exemplary data capture junction object suitable for creation by the flow engine service in the computing system of FIG. 1 according to some example implementations.

Referring now to FIG. 3 with continued reference to FIGS. 1-2, in response to user selection of a GUI element 202 to initiate a data capture form process flow, when the flow engine service 102 detects or otherwise identifies that the field service mobile application 106 is in an offline mode or a connection to the network 130 otherwise does not exist, the flow engine service 102 automatically creates a data capture junction object in a local data storage element at the mobile device 110 for maintaining an association between the particular data capture form process flow being performed and the corresponding field service record(s) associated with the data capture form. In this regard, FIG. 3 depicts an exemplary data model for a data capture junction object 300 to be created in the local data service cache at the mobile device 110 that includes data fields with corresponding identifiers or values that maintain an association between a local object 302 associated with the instance of the data capture form (e.g., FlowRecord), a local object 304 associated with the obtained or captured user input values (e.g., FlowInterview) associated with the instance of the data capture form, and one or more objects 306, 308, 310 corresponding to the parent field service records associated with the instance of the data capture form (e.g., WorkOrder, ServiceAppointment, etc.). Additionally, one or more fields of the data capture junction object 300 may store or otherwise maintain data that characterizes the current execution state or context for the instance of the data capture form process flow (e.g., Status, StatusCategory, etc.).

During subsequent execution of the selected data capture form process flow, the flow engine service 102 automatically creates and maintains one or more different data objects associated with the data capture form that track the progress of the user through the data capture form process flow while also capturing input data values or other user input events or interactions associated with the respective GUI displays 108 associated with the data capture form process flow. For example, the different GUI displays 108 associated with the data capture form process flow may be identified using the downloaded data capture form configuration metadata 148 and utilized to create different local data objects corresponding to the respective GUI displays 108 of the data capture form process flow. In this regard, the data capture form process flow may be represented as a graph data structure, where each respective GUI display 108 corresponds to a different node of the graph. Thus, for each GUI display 108 or node of the data capture form process flow traversed by the user, the flow engine service 102 may automatically create and/or update one or more local data objects that maintain data or information identifying the nodes visited or traversed by the user, the respective sequence or order in which the nodes were traversed, as well as the respective captured data values or other user inputs for the respective nodes of the data capture form process flow.

To generate the GUI displays 108 associated with the data capture form process flow in the offline mode, the flow engine service 102 utilizes the downloaded data capture form configuration metadata 148 and/or other record data previously downloaded to the mobile device 110 to automatically create web components for the respective GUI displays 108 that are configured to be incorporated into the native application 106 by the flow engine service 102 when the data capture form process flow is initiated in an offline mode. For example, for each GUI display 108, the downloaded data capture form configuration metadata 148 may be utilized to generate corresponding HTML code or other presentation code defining the manner in which the GUI display 108 (and GUI elements associated therewith) is to be displayed or rendered along with corresponding JavaScript or other client-side executable behavioral code defining the event-driven behavior of the respective GUI elements contained within that respective GUI display 108. Thus, when the data capture form process flow is executed in an offline mode, the flow engine service 102 causes the HTML code and JavaScript for the web component associated with a respective GUI display 108 to be executed or otherwise referenced by the processing system 114 in connection with executing the native application code 122 for the field service mobile application 106 to incorporate the customized data capture form GUI display screens and corresponding behaviors into the GUI displays 108 rendered by the field service mobile application 106.

In exemplary implementations, the JavaScript or other client-side executable behavioral code defining the event-driven behavior of the GUI displays 108 associated with the data capture form process flow is automatically generated or otherwise modified to utilize the client-side data service 150 in lieu of any calls or requests to the APIs 144 at the database system 104, for example, by automatically replacing any references to an API 144 for a CRUD operation identified using the data capture form configuration metadata 148 with a corresponding request or call to the client-side data service 150 for performing that CRUD operation via the client-side data service 150. As a result, any operations or actions that would otherwise be performed or triggered at the database system 104 during online mode execution of the data capture form process flow may be correspondingly performed by or at the client-side data service 150 (e.g., within the local data service cache) and the correspondingly propagated or uploaded back to the database system 104 automatically by the client-side data service 150 in response to the field service mobile application 106 returning to the online mode or a connection to the network 130 being otherwise reestablished.

Figure 4:
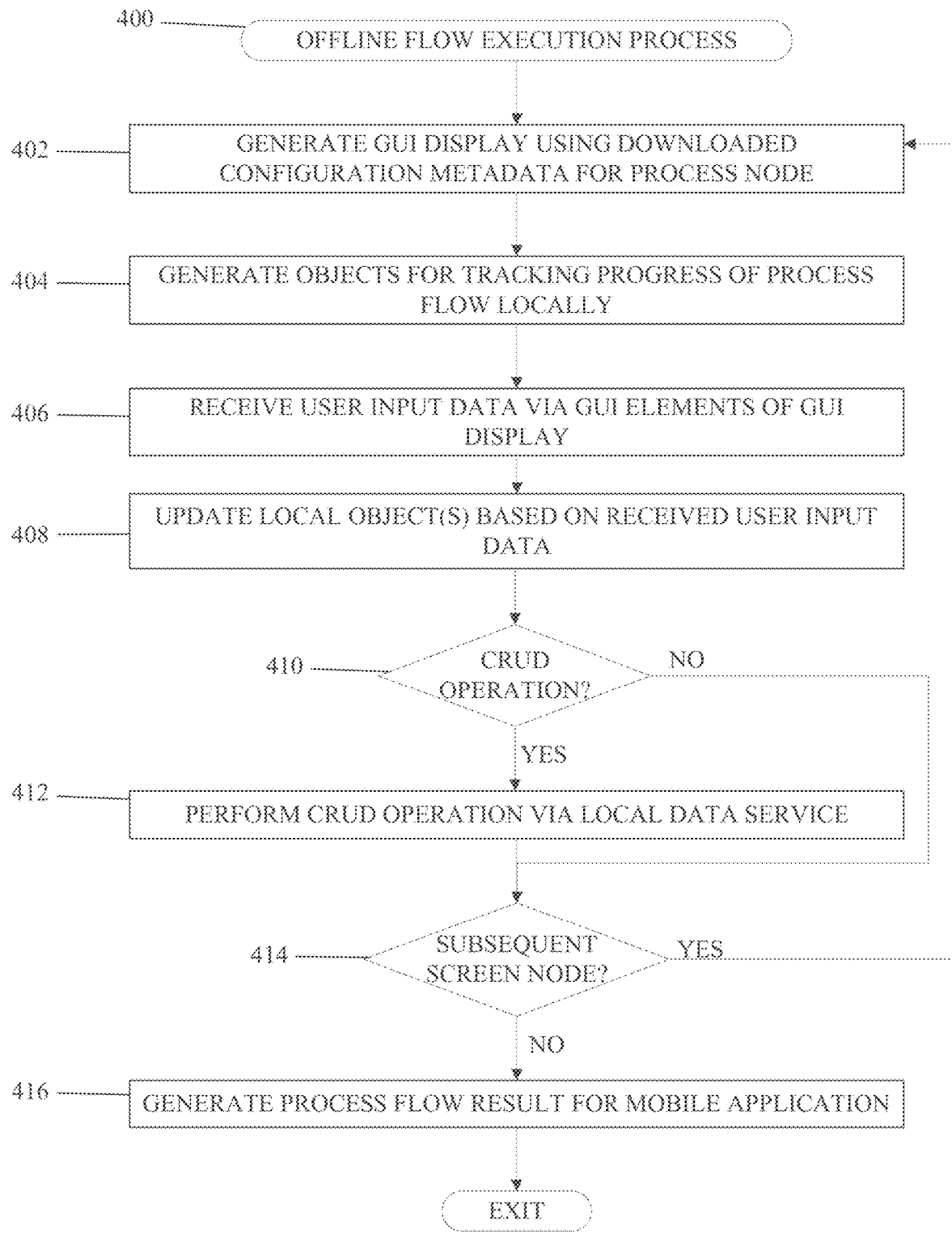
FIG. 4 is a flow diagram illustrating an offline flow execution process suitable for implementation by the native application using the flow engine service in the computing system of FIG. 1 according to some example implementations.

FIG. 4 depicts an exemplary offline flow execution process 400 suitable for implementation by a flow engine service associated with a native application at a mobile device to support offline operation of a process flow defined by custom metadata at a database system and perform additional tasks, functions, and/or operations described herein. For illustrative purposes, the following description may refer to elements mentioned above in connection with FIGS. 1-3. It should be appreciated that the offline flow execution process 400 may include any number of additional or alternative tasks, the tasks need not be performed in the illustrated order and/or the tasks may be performed concurrently, and/or the offline flow execution process 400 may be incorporated into a more comprehensive procedure or process having additional functionality not described in detail herein. Moreover, one or more of the tasks shown and described in the context of FIG. 4 could be omitted from a practical implementation of the offline flow execution process 400 as long as the intended overall functionality remains intact.

Referring to FIG. 4 with continued reference to FIGS. 1-3, in exemplary implementations, the offline flow execution process 400 is automatically initiated in response to a user attempting to initiate or otherwise perform a process flow associated with a mobile application when a mobile device is offline or otherwise lacks a network connection. For example, in some implementations, the native application 106 may automatically invoke the flow engine service 102 or otherwise initiate the offline flow execution process 400 in response to receiving a user input to initiate a process flow associated with the native application 106 when the native application 106 is configured in an offline mode or the mobile device 110 otherwise lacks a communications connection to the network 130. For purposes of explanation, the subject matter is described herein in the context of a server-side customizable data capture form process flow associated with an instance of a field service mobile application. That said, the subject matter described herein is not necessarily limited to any particular type of process flow or native application.

In exemplary implementations, the offline flow execution process 400 begins by automatically generating or otherwise providing a GUI display associated with an initial node or screen of the selected process flow using downloaded configuration metadata for that respective process node (task 402). For example, in one or more implementations, the field service mobile application 106 and/or the flow engine service 102 may automatically prime the mobile device 110 for offline operation of any data capture form process flows associated with the resource owner associated with the mobile device end user by utilizing the application platform 140 and/or APIs 144 at the database system 104 to automatically query and download any data capture form configuration metadata 148 for that resource owner from the database system 104 to local data storage at the mobile device 110. The data capture form configuration metadata 148 defines the sequence, layout and/or other configurable aspects of the GUI displays associated with the respective data capture form process flow and the corresponding database object types and/or data records 146 associated with the respective data capture form process flow. In this regard, in addition to downloading the data capture form configuration metadata 148, in various implementations, the field service mobile application 106 and/or the flow engine service 102 may automatically download record data from one or more data records 146 associated with a respective data capture form process flow for supporting offline operation of the data capture form process flow.

In response to user selection of a GUI element 202 associated with initiation of a data capture form process flow via a GUI display 200 of the field service mobile application 106 in an offline mode, the field service mobile application 106 may automatically invoke the flow engine service 102, which, in turn, updates the GUI display 108 by generating an initial GUI display associated with the selected data capture form process flow using the downloaded data capture form configuration metadata 148. In this regard, the initial data capture form GUI display may include text boxes or other GUI elements for receiving input data for respective data fields defined by the resource owner, with the particular layout, sequencing or other arrangement on the initial data capture form GUI display that has been predefined by the resource owner, such that the initial data capture form GUI display in the offline mode mimics or otherwise emulates execution of the data capture form process flow in an online mode. In one or more exemplary implementations, the flow engine service 102 utilizes the downloaded data capture form configuration metadata 148 and/or record data to automatically generate or otherwise create corresponding web components in the local storage at the mobile device 110 that can be executed or otherwise processed by the field service mobile application 106 to generate JavaScript Object Notation (JSON) data for the respective GUI displays and provide the desired event-driven behavior of the data capture form process flow in the offline mode.

Still referring to FIGS. 1-4, the offline flow execution process 400 continues by automatically generating one or more objects for tracking progress of the data capture form process flow in local storage at the mobile device, receiving input information from the user for one or more of the fields of the data capture form defined for the respective data capture form GUI display via the respective GUI elements of the data capture form GUI display, and automatically updating one or more of the local objects using the received user input information to reflect the user's progress with respect to the data capture form process flow (tasks 404, 406, 408). For example, as described above in the context of FIG. 3, in exemplary implementations, the flow engine service 102 automatically creates a data capture junction object 300 for maintaining an association between the respective instance of data capture form being interacted with by the user, the particular field service data records associated with the respective instance of data capture form (e.g., the particular work order data record, the particular service appointment record, and/or the like) and additional objects generated locally by the flow engine service 102 for tracking the user's progress within the data capture form, that is, the current execution state or context for the instance of the data capture form process flow. In response to receiving values or other data or information from the user via a respective GUI element of the GUI display, the flow engine service 102 may automatically update the local objects to include the input values for the respective data fields associated with the respective GUI display and the corresponding state of the respective GUI display (e.g., updating the status to in progress, identifying the GUI elements that have been interacted with and the corresponding input states or values associated with the GUI elements, and/or the like).

Referring to FIG. 4, in one or more exemplary implementations, the offline flow execution process 400 detects, identifies or otherwise determines whether a CRUD operation is to be performed in response to a particular user input or other event within the context of the respective GUI display of the data capture form process flow, and in response to detecting a CRUD operation event, automatically initiates or otherwise performs the CRUD operation via the local data service (tasks 410, 412). In this regard, when a particular user input or other event associated with a GUI element of a respective data capture form GUI display would trigger a CRUD operation at the database system 104, when in the offline mode, the flow engine service 102 is configurable to automatically initiate or otherwise perform the CRUD operation via the local data service 150. For example, the JavaScript or other executable code associated with the web component for a respective GUI element of a respective data capture form GUI display may be configurable to cause the flow engine service 102 to automatically generate a CRUD request (e.g., a POST request, a GET request, etc.) in an appropriate input format for the local data service 150 and provide the request to the data service 150. The data service 150 may then automatically update and/or retrieve values for one or more fields of record data in the cache associated with the data service 150 to effectively emulate or mimic online operation of the field service mobile application 106 that would otherwise use the application platform 140 and/or the APIs 144 to perform the CRUD operation.

For example, in one implementation, selection of a GUI element indicating the completion of a particular data capture form GUI display may be configured to trigger creation of a data record 146 for a particular type of field service object or other CRM object via an API 144 during online operation. To support offline operation, the JavaScript or other executable code associated with the web component for the respective GUI element indicating completion of the respective data capture form GUI display may correspondingly cause the flow engine service 102 to provide a request to the data service 150 to create a record for that particular type of object using at least some of the user input values received via the GUI elements of that respective data capture form GUI display. In response, the data service 150 automatically creates in its associated cache or other local data storage at the mobile device 110, a respective instance of that record having the user input values. Additionally, the flow engine service 102 may automatically update the data capture junction object 300 to maintain an association between the new record created at the data service 150 and the respective instance of the data capture form process flow.

Still referring to FIG. 4, in response to receiving a user input to a GUI element that indicates that the user has completed the respective process flow node or would otherwise like to progress from the current GUI display, the offline flow execution process 400 detects, identifies or otherwise determines whether the next or subsequent node of the process flow corresponds to a screen node having a respective GUI display associated therewith (task 414). For example, after completing a respective data capture form GUI display, the user may select a button or similar GUI element to advance to the next process node of the data capture form process flow. In response to identifying the subsequent node of the process flow corresponds to a screen node, the offline flow execution process 400 repeats the loop defined by tasks 402, 404, 406, 408, 410 and 412 to dynamically update the GUI display at the mobile device to the next GUI display of the data capture form process flow. In this regard, after updating the local objects to maintain the received user input values for the respective data fields of the respective data capture form GUI display and to reflect the current state or progress for that respective data capture form GUI display as completed, the flow engine service 102 utilizes the downloaded data capture form configuration metadata 148 to automatically generate the next GUI display of the selected data capture form process flow for receiving user input information for additional data fields. Thereafter, the flow engine service 102 correspondingly updates the data capture junction object 300 and/or other local objects to reflect the current state of the data capture form process flow as the user progresses through the respective data capture form GUI displays. In this manner, in the offline mode, the flow engine service 102 effectively logs or otherwise captures the user interactions within the context of the respective data capture form process flow to enable navigation between GUI displays of the data capture form process flow while concurrently capturing and maintaining the values, data or other information input by the user via the respective data capture form GUI displays.

After traversing or otherwise progressing through the various nodes of the process flow, the offline flow execution process 400 automatically generates or otherwise constructs a process flow result for the mobile application and provides the process flow result back to the mobile application for subsequent handling and/or processing (task 416). In this regard, the flow engine service 102 may automatically generate JSON data provided back to the field service mobile application 106 for updating the form landing page GUI display 200 to reflect completion of the particular data capture form process flow using one or more of the data capture junction object 300 and/or the other local objects for tracking progress of the data capture form process flow.

Still referring to FIGS. 1-4, in response to exiting the offline mode, the data service 150 is configured to automatically update the database 134 at the database system 104 to reflect the user's interaction with respect to the respective data capture form process flow. For example, the data service 150 may automatically generate a request for a CRUD operation provided to an API 144 at the database system 104 to create, modify or otherwise update a data record 146 for a field service object or other CRM object that was created during offline execution of the data capture form process flow. In this regard, in some implementations, a button or similar GUI element associated with the completion of the data capture form may be configurable to cause the flow engine service 102 to provide a request to the data service 150 to create a form record corresponding to the instance of the data capture form process flow, such that the data service 150 automatically creates a corresponding form record 146 at the database system 104 that is associated with the field service object or other CRM object for which the data capture form was performed (e.g., by using the data capture junction object 300 to associate the form record with the appropriate work order, service appointment, and/or the like). In other implementations, the flow engine service 102 may be configurable to create and maintain the data capture junction object 300 at the mobile device 110 via the data service 150, such that the data service 150 automatically uploads the data capture junction object 300 to the database system 104 via an API 144 associated with the application platform 140. In such implementations, the application platform 140 and/or the API 144 is configured to automatically translate or otherwise convert the data capture junction object 300 into a corresponding data capture form record 146 in the database 134. Additionally, the data capture junction object 300 may be utilized to automatically populate one or more fields of the form record 146 to maintain the desired association with the respective work order record 146, the respective service appointment record 146 and/or one or more other records 146 for the field service object(s) and/or CRM object(s) associated with the respective instance of the data capture form.

For example, the application platform 140 and/or the API 144 may utilize the data capture junction object 300 to create a new data capture form record 146 in the database 134 having the desired parent-child relationships between other field services records 146 in the database 134 corresponding to the respective local objects 306, 308, 310 (e.g., the parent WorkOrder, ServiceAppointment and/or the like) with field values populated with user input data or other values from the local objects 302, 304 utilized to track the user's progress within the form. Additionally, the application platform 140 and/or the API 144 may automatically assign or otherwise swap and replace any placeholder identification values assigned by the client-side data service 150 with an updated record identification value assigned to the data capture form record 146 by the application platform 140 and/or the API 144. In this regard, the resulting form record 146 created at the database system 104 includes the values, data or other input information received from the user during offline execution of the data capture form process flow along with other state information pertaining to the user's progress or other interaction with the respective instance of the data capture form process flow.

By virtue of the offline flow execution process 400, the flow engine service 102 may utilize the downloaded data capture form configuration metadata 148 and the client-side data service 150 to support offline execution of a data capture form process flow in a manner that reflects the desired customizations defined by a resource owner or other server-side controls without reliance on a communications network 130. For example, a field service technician user of a field service mobile application 106 may initiate and progress a data capture form process flow to input information for a data capture form defined by a particular resource owner associated with that field technician user to capture data pertaining to a particular service appointment, work order, and/or the like while in a remote area having intermittent and/or nonexistent connectivity to the communications network 130, with CRUD operations associated with the data capture form (e.g., to create, modify and/or update the service appointment, work order, and/or other field service object data records 146 in the database 134) being performed locally via the data service 150 and the respective cache or local storage associated with the data service 150. In this manner, the behavior of the field service mobile application 106 with respect to execution of the data capture form process flow and the corresponding user experience may be substantially the same as in an online mode, such that the offline nature of the data capture form process flow may be imperceptible to the field service technician. Thereafter, when a connection to the communications network 130 is reestablished or the field service mobile application 106 otherwise returns to an online mode, the client-side data service 150 may automatically synchronize its local cache to the database 134 at the database system 104 to correspondingly reflect the desired CRUD operations associated with the offline execution of the data capture form process flow. In this manner, the database system 104 is automatically updated to reflect the offline execution of the data capture form process flow without requiring any additional user interaction.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read-only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as services) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
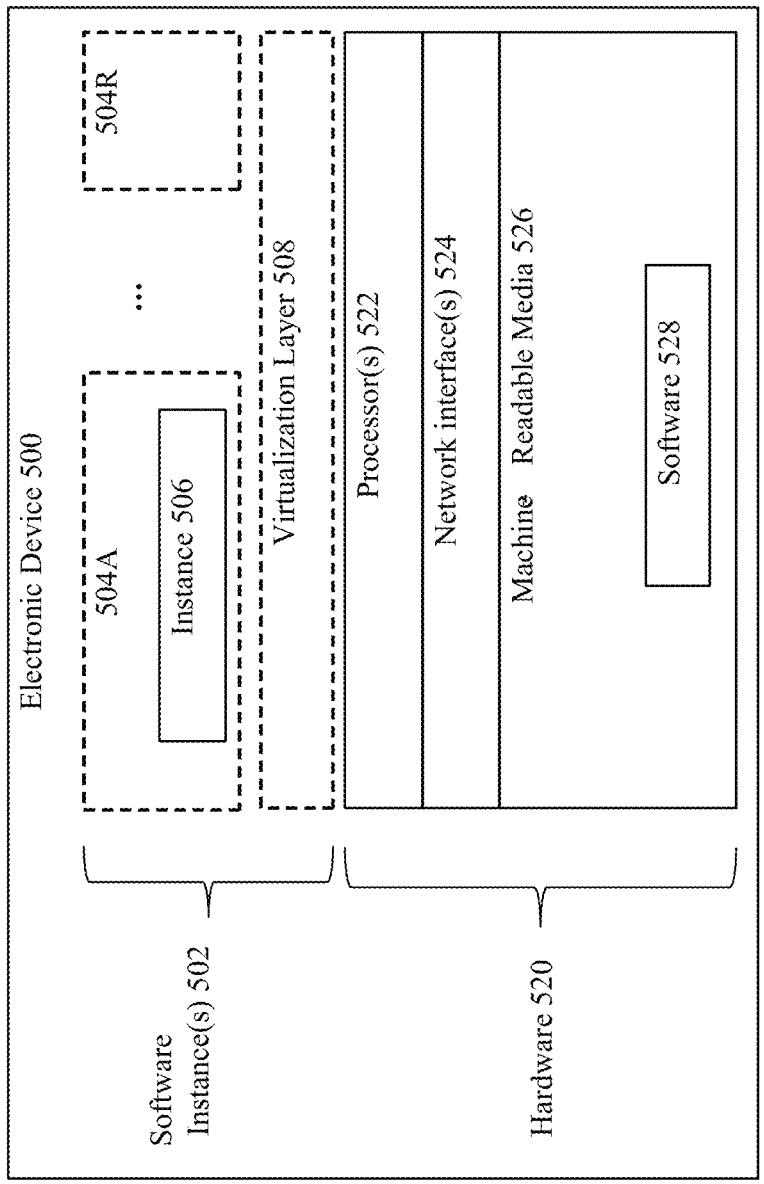
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described applications and related services may be implemented in one or more electronic devices 500. In one implementation: 1) each of the clients is implemented in a separate one of the electronic devices 500 (e.g., in end user devices where the software 528 represents the software to implement clients to interface directly and/or indirectly with the field service mobile application and/or flow engine service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the field service mobile application and/or flow engine service is implemented in a separate set of one or more of the electronic devices 500 (e.g., a set of one or more server devices where the software 528 represents the software to implement the field service mobile application and/or flow engine service); and 3) in operation, the electronic devices implementing the clients and the field service mobile application and/or flow engine service would be communicatively coupled (e.g., by a network) and would establish between them (or through one or more other layers and/or or other services) connections for submitting requests to the field service mobile application and/or flow engine service. Other configurations of electronic devices may be used in other implementations (e.g., an implementation in which the client and the field service mobile application and/or flow engine service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-1904R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-1904R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-1904R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-1904R if implemented, are collectively referred to as software instance(s) 502.

Alternative implementations of an electronic device may have numerous variations from that described above. For example, customized hardware and/or accelerators might also be used in an electronic device.

Figure 5B:
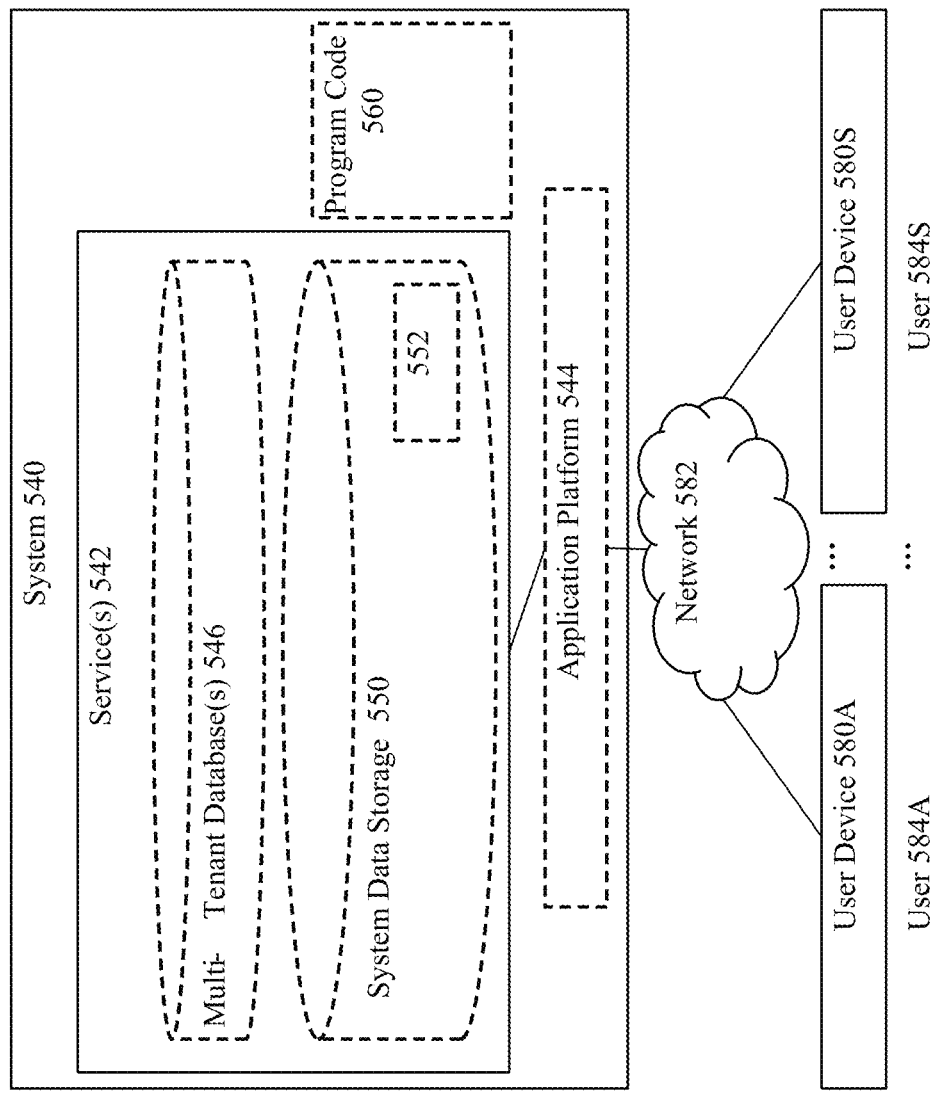
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including one or more services configurable to support a field service mobile application and/or a flow engine service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-1980S over a network 582. The service(s) 542 may be on-demand services that are made available to one or more of the users 584A-1984S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-1984S). The service(s) 542 may communicate with each other and/or with one or more of the user devices 580A-1980S via one or more APIs (e.g., a REST API). In some implementations, the user devices 580A-1980S are operated by users 584A-1984S, and each may be operated as a client device and/or a server device. In some implementations, one or more of the user devices 580A-1980S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 540 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 540 may include an application platform 544 that enables PAAS for creating, managing, and executing one or more applications developed by the provider of the application platform 544, users accessing the system 540 via one or more of user devices 580A-1980S, or third-party application developers accessing the system 540 via one or more of user devices 580A-1980S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-1980S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-1980S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 562 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including by the field service mobile application and/or flow engine service, may be coded using Procedural Language/ Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-1980S.

Each user device 580A-1980S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-1984S to interact with various GUI pages that may be presented to the one or more of users 584A-1984S. User devices 580A-1980S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-1980S might include an HTTP client, commonly referred to as a "browser," for sending and receiving HTTP messages to and from server(s) of system 540, thus allowing users 584A-1984S of the user devices 580A-1980S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of supporting offline operation of a native application at a client device, the method comprising:
   providing a graphical user interface (GUI) display associated with the native application at the client device, the GUI display comprising a selectable GUI element for a flow associated with a record at a database system coupled to a communications network;
   in response to selection of the selectable GUI element in an offline mode:
      creating a junction object in a data storage at the client device maintaining an association between the flow and the record; and
      generating a first GUI display associated with the flow at the client device based at least in part on downloaded flow configuration metadata associated with the flow in the data storage at the client device;
   receiving, at the client device via one or more GUI elements of the first GUI display, input information for one or more fields for a form associated with the flow;
   creating, in the data storage at the client device, a second record comprising the input information for the one or more fields for the form associated with the record;
   updating the junction object to maintain an association with the second record; and
   in response to exiting the offline mode, automatically creating a form record associated with the record at the database system, the form record comprising the input information for the one or more fields from the second record in the data storage at the client device.

2. The method of claim 1, further comprising downloading the downloaded flow configuration metadata from the database system to the data storage at the client device prior to entering the offline mode.

3. The method of claim 1, further comprising downloading the downloaded flow configuration metadata from the database system to the data storage at the client device when the native application launches.

4. The method of claim 1, wherein creating the second record comprises creating an object in the data storage to track progress of a user with respect to the form associated with the flow.

5. The method of claim 1, wherein automatically creating the form record comprises converting the junction object in the data storage into the form record at the database system.

6. The method of claim 1, wherein:
   creating the junction object comprises providing a request to a data service at the client device to create the junction object in a cache associated with the data service; and
   automatically creating the form record comprises the data service automatically uploading the junction object to the database system via an application programming interface (API) at the database system in response to exiting the offline mode, wherein the API is configurable to convert the junction object into the form record and store the form record in a database at the database system.

7. The method of claim 1, wherein:
   the native application comprises a field service mobile application;
   the flow comprises a data capture form process flow; and
   the record comprises one of a work order, a service appointment, or a work order line item.

8. A non-transitory machine-readable storage medium that provides instructions that, when executed by a processor, are configurable to cause the processor to perform operations comprising:
   providing a graphical user interface (GUI) display associated with a native application at a client device, the GUI display comprising a selectable GUI element for a flow associated with a record at a database system;

in response to selection of the selectable GUI element in an offline mode:
   creating a junction object in a data storage at the client device maintaining an association between the flow and the record; and
   generating a first GUI display associated with the flow at the client device based at least in part on downloaded flow configuration metadata associated with the flow in the data storage at the client device;
receiving, at the client device via one or more GUI elements of the first GUI display, input information for one or more fields for a form associated with the flow;
creating, in the data storage at the client device, a second record comprising the input information for the one or more fields for the form associated with the record;
updating the junction object to maintain an association with the second record; and
in response to exiting the offline mode, automatically creating a form record associated with the record at the database system, the form record comprising the input information for the one or more fields from the second record in the data storage at the client device.

9. The non-transitory machine-readable storage medium of claim 8, wherein the instructions are configurable to cause the processor to download the downloaded flow configuration metadata from the database system to the data storage at the client device prior to entering the offline mode.

10. The non-transitory machine-readable storage medium of claim 8, wherein the instructions are configurable to cause the processor to download the downloaded flow configuration metadata from the database system to the data storage at the client device when the native application launches.

11. The non-transitory machine-readable storage medium of claim 8, wherein the instructions are configurable to cause the processor to create an object in the data storage to track progress of a user with respect to the form associated with the flow.

12. The non-transitory machine-readable storage medium of claim 8, wherein the instructions are configurable to cause the processor to convert the junction object in the data storage into the form record at the database system.

13. The non-transitory machine-readable storage medium of claim 8, wherein the instructions are configurable to cause the processor to provide a request to a data service at the client device to create the junction object in a cache associated with the data service, wherein the data service automatically uploads the junction object to the database system via an application programming interface (API) at the database system in response to exiting the offline mode, wherein the API is configurable to convert the junction object into the form record and store the form record in a database at the database system.

14. The non-transitory machine-readable storage medium of claim 8, wherein the native application comprises a field service mobile application.

15. The non-transitory machine-readable storage medium of claim 14, wherein the flow comprises a data capture form process flow.

16. A computing device comprising:
   at least one non-transitory machine-readable storage medium that stores software for a native application including a flow engine service and a client-side data service; and
   at least one processor, coupled to the at least one non-transitory machine-readable storage medium, to execute the software that implements the native application and the flow engine service and that is configurable to:
      provide a graphical user interface (GUI) display associated with the native application, the GUI display comprising a selectable GUI element for a flow associated with a record at a database system;
      in response to selection of the selectable GUI element in an offline mode:
         create, by the flow engine service at the computing device, a junction object maintaining an association between the flow and the record; and
         generate a first GUI display associated with the flow based at least in part on downloaded flow configuration metadata associated with the flow at the computing device;
      receive, via one or more GUI elements of the first GUI display, input information for one or more fields for a form associated with the flow;
      create, by the flow engine service at the computing device, a second record comprising the input information for the one or more fields for the form associated with the record;
      update, by the flow engine service, the junction object to maintain an association with the second record; and
      in response to exiting the offline mode, automatically create a form record associated with the record at the database system using the junction object, wherein the form record comprises the input information for the one or more fields from the second record at the computing device.

17. The computing device of claim 16, wherein the software is configurable to download the downloaded flow configuration metadata from the database system to the computing device prior to entering the offline mode.

18. The computing device of claim 16, wherein the software is configurable to download the downloaded flow configuration metadata from the database system to the computing device when the native application launches.

19. The computing device of claim 16, wherein the native application comprises a field service mobile application.

20. The computing device of claim 19, wherein the flow comprises a data capture form process flow.

* * * * *